April 6, 1965
J. T. SMITH
3,176,856
IMPACT ABSORBING APPARATUS
Filed April 2, 1963
2 Sheets-Sheet 1
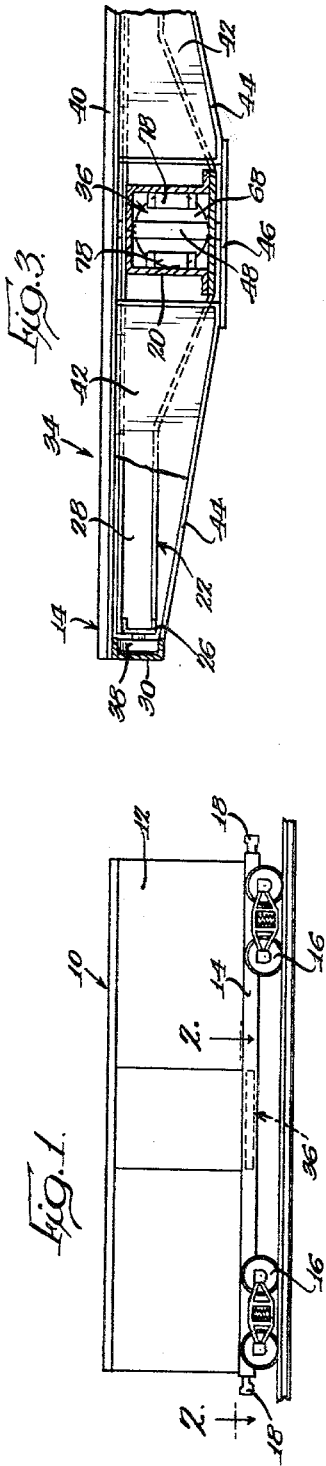
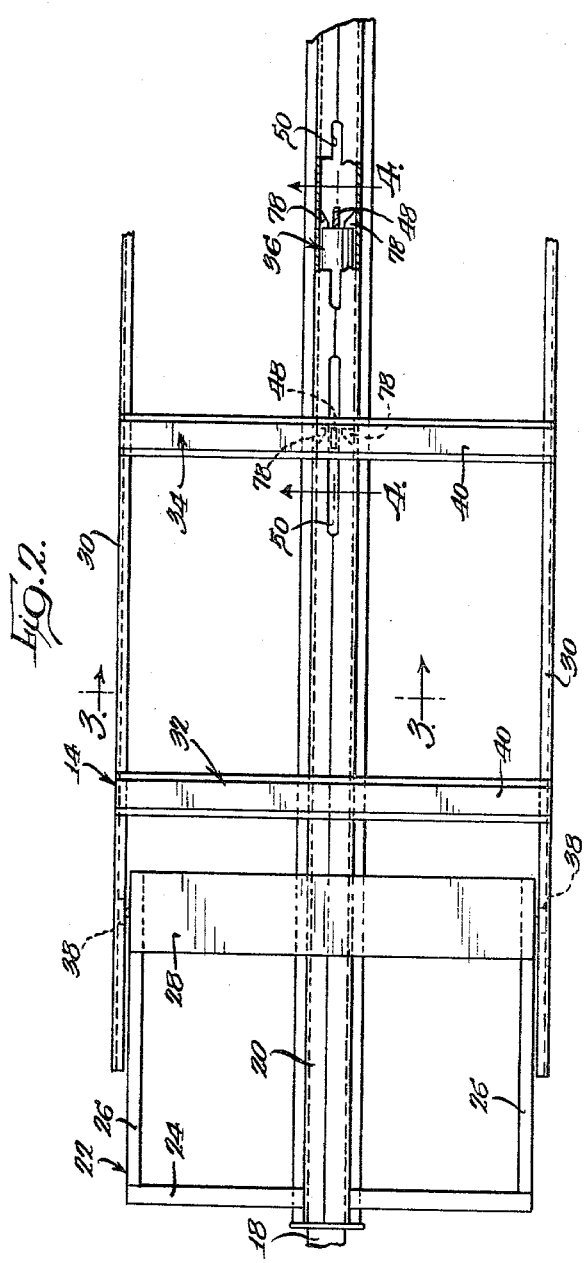
INVENTOR.
James T. Smith
BY
B. Gordon Allen
Atty April 6, 1965 J. T. SMITH 3,176,856
IMPACT ABSORBING APPARATUS
Filed April 2, 1963 2 Sheets-Sheet 2
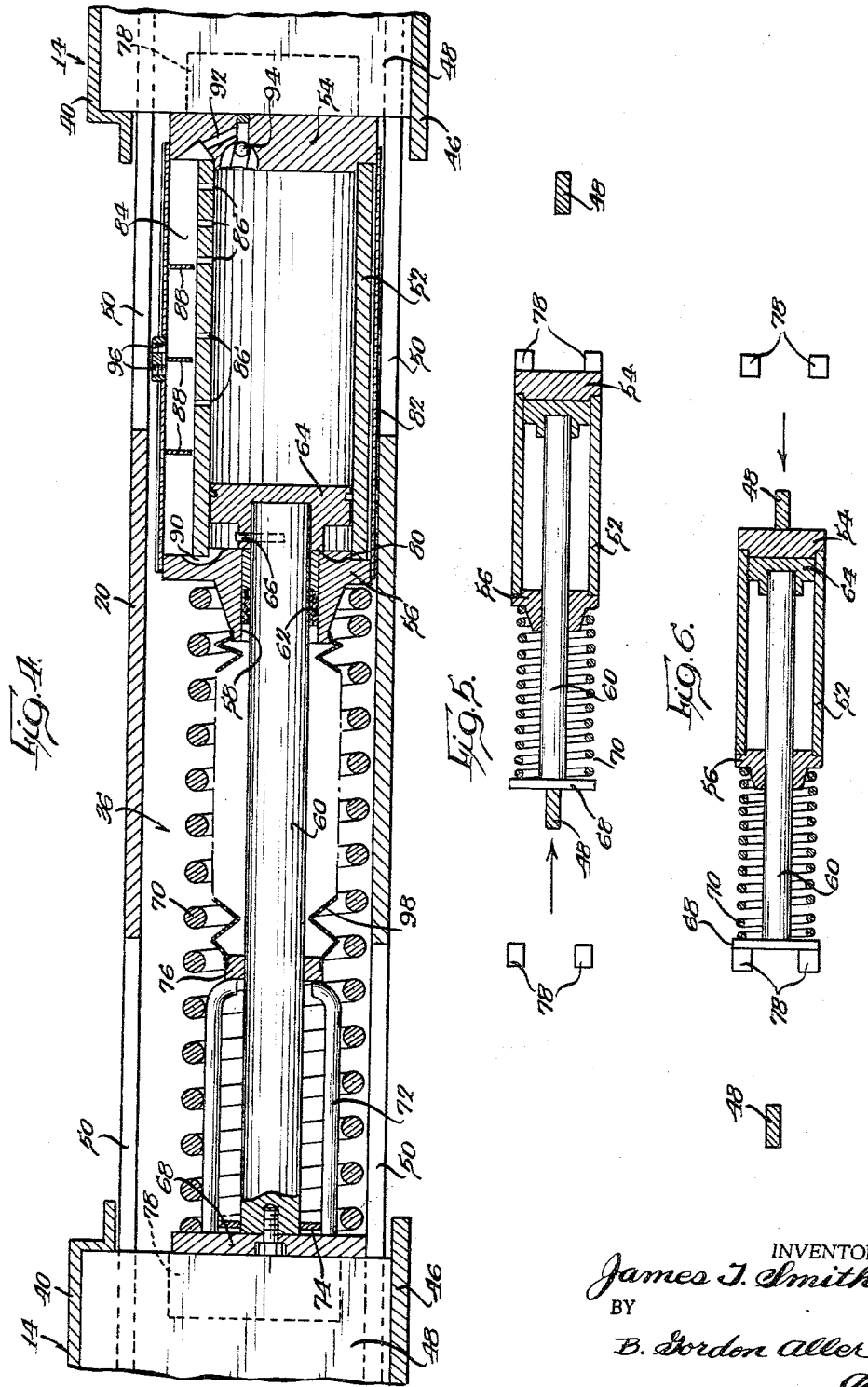
INVENTOR.
James T. Smith
BY
B. Gordon Aller
atty

United States Patent Office 3,176,856
Patented Apr. 6, 1965

3,176,856
IMPACT ABSORBING APPARATUS
James T. Smith, Wilmette, Ill., assignor to
Jay R. Sheesley, Glencoe, Ill.
Filed Apr. 2, 1963, Ser. No. 270,020
5 Claims. (Cl. 213—43)

The present invention relates to an impact absorbing apparatus, and in particular to an improved impact absorbing apparatus for railway rolling stock.

Railway rolling stock, particularly freight cars, are subject to appreciable impacts in switch and classification yards where the trains are both broken up and made up. It is customary to attempt to limit the speed of the free traveling cars so that at the time of impact with another car the speed is not more than 3 or 4 m.p.h. However, this is not always possible, and speeds as high as ten or more miles per hour are known. Also, coupling speeds of 10, 12, or more miles per hour are not uncommon when making up a train or picking up cars from sidings, loading docks, and the like.

Tremendous thought, study, and research have been given to the problem of protecting the load or lading against damage from the impacts given to a loaded or partially loaded freight car upon impact or coupling. The character of the lading itself usually dictates the best way it may be secured in a car. Some of the securing techniques provide for a controlled and limited movement of the load within the car to absorb the impacts without damage to the load.

The draft gear connected to the coupler absorbs a part of the impact, but its effectiveness is limited by the severe limitation on the movement of the coupler relative to the remainder of the car. Its movement is limited to about two and three-quarter inches so as to minimize the amount of slack in a train that has to be taken up on starting and absorbed on stopping.

It has been proposed to interpose an impact absorbing cushion in the car between the draft gear and the lading, which will permit the lading to move up to a certain distance on impact and thereafter be restored to its original or normal position. Such cushion permits maximum movement of the lading from as little as eight inches to as much as 40 inches. It is thought by some that the longer the cushioned movement is, the greater the protection afforded the lading. Exceedingly long cushioned movement reduces the available lading space for standard length freight car frames by nearly ten percent over cars not so equipped.

The present invention is concerned with improvements in impact absorbing cushions whereby the advantages of long movement may be retained with an appreciably shorter movement.

It is therefore a principal object of the present invention to provide a hydraulic impact absorbing cushion between the draft gear and the lading in a freight car having a movement less than half the maximum movement of long movement devices now available, while retaining the load protecting qualities of such devices.

Another object is to provide a hydraulic impact absorbing cushion between the draft gear and the lading in a freight car, wherein the maximum lading movement is less than twenty inches.

Another object is to provide a hydraulic impact absorbing cushion incorporating a hydraulic cylinder having a piston movable therein and surrounded by a fluid reservoir wherein the rate of fluid flow from the cylinder to the reservoir is diminished as the piston moves in the cylinder in absorbing an impact imparted to the freight car.

Other objects and advantages will become apparent from the following description, taken in conjunction with the accompanying drawings, wherein FIG. 1 is a side elevational view of a freight car incorporating the hydraulic impact absorbing cushion of the present invention;

FIG. 2 is a plan view of the body underframe and the carriage assembly, illustrating the position of the hydraulic impact absorbing cushion therebetween;

FIG. 3 is a transverse sectional view through the frames, taken along the line 3—3 of FIG. 2, looking in the direction of the arrows;

FIG. 4 is an enlarged longitudinal sectional view through the hydraulic impact absorbing cushion of the present invention, in its normal position, taken along the line 4—4 of FIG. 2, looking in the direction of the arrows; and FIGS. 5 and 6 are diagrammatic views showing the cushion in collapsed condition with the impact forces being applied from opposite ends.

Referring first to FIGS. 1 to 3, it will be observed that a freight car 10 comprises the customary box or body 12 carried on a body underframe 14, conventional running gear 16, and couplers 18 which are connected to a draft gear mounted within a center sill 20 which forms part of a carriage assembly 22. The carriage assembly also includes end frame members 24, only one of which is shown, extending between side sills 26 which are also interconnected by a bolster 28 adjacent each end, the bolsters being connected to the running gear or trucks 16. The carriage frame assembly is a rigid unit and movably supports the body underframe 14, the body 12, and the lading contained therein.

The body 12 is supported on the body underframe 14 which includes a pair of inwardly facing side channels 30, and transverse members 32 and 34, the members 34 being the center transverse members and associated with a hydraulic impact absorber and cushion assembly 36 constituting the subject matter of the present invention.

The side frame channels 30 are adapted to ride on rollers 38 mounted at the outer ends of the bolsters 28 (FIG. 3). The body underframe 14 and body 12 are thus supported for movement on the carriage assembly 22.

Each of the transverse members 32 and 34 includes a top channel 40, side plates 42, bottom plates 44, and a plate 46 bridging between the bottom plates 44 to embrace the center sill 20 which thus extends through an opening between the side plates 42, the top channel 40, and the bridging plate 46. Additionally, each center transverse member 34 includes a force transmitting member or abutment 48 extending between the upper channel 40 and the bottom bridging plate 46 and adapted to abut against an outer end of the hydraulic impact absorber cushion device 36. The members 48 extend through openings 50 in the top and bottom walls of the center sill in order to engage the ends of the hydraulic impact absorber cushion device.

Referring to FIGS. 1 and 2, if the car 10 is struck from the right-hand side, the force transmitted to the load will be from right to left, and the load will tend to shift toward the left. This force is transmitted through the carriage assembly 22, the body underframe 14, to the lading therein, and is also transmitted through the right-hand member 48 to the hydraulic cushion device 36 which supplies an absorbing counterforce and stops the movement of the body 12 and the lading without damage thereto.

The hydraulic impact absorber cushion device 36 includes a cylinder 52 having a head 54 enclosing one end, and a cap 56 closing the other end, the cap having an opening 58 therein through which a piston rod 60 extends. Leakage of hydraulic fluid from the cylinder 52 through the opening 58 is prevented by appropriate packing 62. A piston 64, slidable in the cylinder 52, is fixed to the rod 60 by a pin 66 or other suitable device.

The outer end of the piston rod 60 is affixed to an abutment head or plate 68 which normally is adapted to be abutted against one of the force transmitting members 48 while the other member 48 is abutted against the piston head 54 as described hereinafter, thus insuring proper location of the hydraulic cushion device 36 between the two members 48, so as to absorb impacts from either end of the car.

The cylinder head 54 and abutment head or plate 68 are urged apart and into contact with the force transmitting members 48 by a heavy coil spring 70 which acts between the inner face of the head or plate 68 and the outer face of the cap 56, thus surrounding the extended portion of the piston rod 60. At its outer end the spring is supported by a cage 72 which is secured between a guide plate 74 carried on the piston rod 60 adjacent the abutment head and a stop ring 76 fixed to the piston rod 60 at a point about the middle of its extended length from the cylinder 52. The cage 72 is formed of four bars which have their inner ends bent toward the rod 60 and welded to the stop ring 76 and which are welded to the guide plate 74 adjacent their outer ends. The stop ring can be positioned to limit the piston movement to less than the full cylinder length, if desired, but this is not recommended.

The spring 70, in addition to abutting the head 54 and the abutment head or plate 68 against the force transmitting members 48, also normally abuts them against stops 78 which are welded to the inner faces of the side walls of the center sill 20, thus accurately to locate the car body 12 in the center of the carriage assembly 22 during normal operation of the car and the hydraulic impact absorber cushion device. The outward movement of the piston 64 is also limited by a shoulder 80 which abuts against the inner face of the cap 56.

The cylinder 52 is enclosed within a casing 82 which defines a reservoir 84 surrounding the outer wall of the cylinder. The ends of the casing 82 are welded respectively to the cylinder head 54 and the cap 56 to insure a tight structure capable of withstanding very appreciable internal forces.

The interior of the cylinder 52 communicates with the reservoir 84 through a plurality of small fluid flow restricting orifices 86 spaced along the length of the cylinder, and the reservoir itself is divided into four compartments by three crescent shaped baffles 88 which project inwardly from the outer upper portion of the casing 82 toward the outer wall of the cylinder 52. It will be noted from FIG. 4 that the casing is offset relative to the cylinder so that it has appreciably greater space at its upper portion than it does at its lower portion. The baffles extend inwardly toward the outer wall of the cylinder, but do not touch it, being spaced therefrom a small fraction of an inch. Thus, they impede a free and unrestricted flow of hydraulic fluid from the head end of the cylinder toward the rod end where a relatively large passage 90 connects the reservoir 84 with the interior of the cylinder behind or at the underside of the piston 64. As shown, the passage 90 is sufficiently large to accommodate the inflow at the rod side of the advancing piston 64 without impeding the piston movement. It will be noted that reading from left to right a single orifice 86 lies between the first two baffles 88, a single orifice 86 lies between the second two baffles 88, and three orifices lie between the last baffle 88 and the head 54. The force applied to telescope the piston and cylinder against the force of the spring 70 also does so against the resistance of the hydraulic fluid within the cylinder 52 and the reservoir 88 having to pass through the small orifices 86 and under the baffles 88. As the piston 64 moves farther toward the right, the greater this obstruction becomes, due to the progressive closing of the orifices 86. Some of them will be opened to the underside of the piston, increasing the potential rate of flow into the rod end of the cylinder, but this is countered by the reduced outflow rate and the baffles 88. By the time the piston 64 has closed the last orifice 86, substantially all that is considered to be a maximum force applied to the lading will have been absorbed.

After the impact has been absorbed and the box car is standing either at rest or traveling in a train, the spring 70 will restore the hydraulic impact absorber cushion device 36 to its normal position or that shown in FIG. 4. This is accomplished by expelling hydraulic fluid from the rod end of the cylinder through the passage 90 and orifices 86 and by sucking hydraulic fluid through an angular passage 92 in the head 54 past a check valve 94. This passage, when open, presents relatively little obstruction to drawing hydraulic fluid from the reservoir 84 into the cylinder at the head end thereof. During the impact absorbing operation, the check valve will be in the closed position shown in FIG. 4. Also as the orifices 86 are opened to the head end of the cylinder, fluid will be drawn in through them. The hydraulic impact absorber cushion assembly 36 is in normal position when the head plate 68 and the cylinder head 54 abut simultaneously the force transmitting members 48 and the sill stops 78 at their respective ends.

The reservoir 84 is filled with hydraulic fluid through a pair of openings normally closed by plugs 96 in the top of the reservoir on opposite sides of the center baffle 88. The quantity of fluid which is displaced at the head end of the cylinder during collapsing of the device is greater than that which may be absorbed at the rod end of the cylinder. Consequently, the reservoir 84 can never be completely filled with hydraulic fluid and an air space must be left above the fluid level. This air is compressed during the collapsing of the device in absorbing an impact, and also adds to the impact absorbing function.

That portion of the piston rod 60 which must slide through the packing 62 and into the cylinder 52, is preferably polished as by chromium plating. Since this would be exposed to the adverse working of the elements, a bellows 98 is secured between the stop ring 76 and the cap 56, thereby to protect that portion of the piston rod. The end of the piston rod extending to the left of the stop ring 76 is left unprotected.

The impact absorbing cushion assembly 36 is enclosed within the center sill 20. It is prevented from rotating therein by suitable guides (not shown) and by engagement of the head plate 68 and cylinder head 54 with the sill stops 78 and force transmitting members 48.

It will be noted that during collapsing of the unit the stop ring 76 would contact the cap 56 at approximately the same time that the piston 64 would contact the head 54. However, this ordinarily is not permitted since just before that would occur, the orifice 86 adjacent the cylinder head 54 is closed and no more hydraulic fluid can be expelled from the cylinder, and collapsing or telescoping of the unit is terminated. Therefore, on the collapsing operation there is no abrupt contact of the parts, and the contact of the parts in the opposite direction when it is being restored to normal is done slowly, inasmuch as the orifices and the spaces between the lower edges of the baffles 88 and the outer surface of the cylinder 62 are sufficient to provide restriction on the flow of hydraulic fluid even though the passage 92 past the check valve 94 is relatively unobstructed.

FIGS. 5 and 6 diagrammatically show how the apparatus functions upon the application of a force from either end. If the force is applied from the left or against the abutment head or plate 68, the cylinder head 54 is held against the sill stops 78 and the piston moves in the cylinder. If the force is applied from the right or against the cylinder head 54, the abutment head or plate is held against the sill stops 78 and the cylinder 52 is telescoped over the piston 64. From this it will be observed that one end of the hydraulic impact absorbing cushion is always abutted against either the sill stops 78 or the force transmitting member 48, or both.

From the foregoing description it will be apparent that the objectives which have been claimed for this device at the outset of the specification are attained by the disclosed structure.

While a preferred embodiment of the invention has been shown and described, it will be apparent that numerous modifications and variations thereof may be made therein without departing from the underlying principles of the invention. It is therefore desired, by the following claims, to include within the scope of the invention all such variations and modifications by which substantially the results of the invention may be obtained through the use of substantially the same or equivalent means.

What is claimed as new and desired to be secured by United States Letters Patent is:

1. An impact absorbing apparatus for interposition between the draft gear and the lading in a railway car of the type having a center sill and a lading supporting frame mounted for movement relative to each other, the apparatus having a pair of heads normally abutted against stops carried on the center sill and force transmitting members carried on the lading supporting frame, a cylinder mounting one of the heads, a piston rod mounted on the other of the heads and projecting into the cylinder, a piston slidable in the cylinder and fixed to the rod, a fluid reservoir surrounding the cylinder, and a spring interposed between the other of the heads and the cylinder to urge the heads toward normal position, the improvement comprising a plurality of fluid flow restricting orifices in the side wall of the cylinder beyond the head end of the piston in its normal position, said orifices being spaced longitudinally and communicating with the reservoir so that when the heads are moved toward each other hydraulic fluid is expelled from the head end of the cylinder and taken in at the rod end of the cylinder and the piston progressively closes said orifices in the head end to diminish the fluid outflow rate from the head end, flow restricting means in the reservoir limiting the fluid flow through the reservoir longitudinally of the cylinder, and a check valve controlled passage between the reservoir and the head end of the cylinder to accommodate rapid inflow of fluid when the spring is restoring the heads to normal position.

2. An impact absorbing apparatus for interposition between the draft gear and the lading in a railway car of the type having a center sill and a lading supporting frame mounted for movement relative to each other, the apparatus having a pair of heads normally abutted against stops carried on the center sill and force transmitting members carried on the lading supporting frame, a cylinder mounting one of the heads, a piston rod mounted on the other of the heads and projecting into the cylinder, a piston slidable in the cylinder and fixed to the rod, a fluid reservoir defining casing surrounding the cylinder, and a spring interposed between the other of the heads and the cylinder to urge the heads toward normal position, the improvement comprising a plurality of fluid flow restricting orifices in the side wall of the cylinder beyond the head end of the piston in its normal position, said orifices being spaced longitudinally and communicating with the reservoir so that when the heads are moved toward each other hydraulic fluid is expelled from the head end of the cylinder and taken in at the rod end of the cylinder and the piston progressively closes said orifices in the head end to diminish the fluid outflow rate from the head end, fluid flow restricting baffles mounted interiorly of the casing and dividing the reservoir into compartments having limited flow therebetween, and a check valve controlled passage between the reservoir and the head end of the cylinder to accommodate rapid inflow of fluid when the spring is restoring the heads to normal position.

3. An impact absorbing apparatus for interposition between the draft gear and the lading in a railway car of the type having a center sill and a lading supporting frame mounted for movement relative to each other, the apparatus having a pair of heads normally abutted against stops carried on the center sill and force transmitting members carried on the lading supporting frame a cylinder mounting one of the heads, a piston rod mounted on the other of the heads and projecting into the cylinder, a piston slidable in the cylinder and fixed to the rod, a fluid reservoir surrounding the cylinder, and a spring interposed between the other of the heads and the cylinder to urge the heads toward normal position, the improvement comprising a plurality of fluid flow restricting orifices in the side wall of the cylinder beyond the head end of the piston in its normal position, a large capacity unrestricted passage connecting one end of the reservoir with the rod end of the cylinder so that fluid may flow therethrough from the rod end of the cylinder to the reservoir at a rate sufficiently great as not to impede the restoration of the apparatus to normal position by the spring, said cylinder orifices being spaced longitudinally and communicating with the reservoir so that when the heads are moved toward each other hydraulic fluid is expelled from the head end of the cylinder and taken in through said passage at the rod end of the cylinder and the piston progressively closes said orifices in the head end to diminish the fluid outflow rate from the head end, and a check valve controlled passage between the other end of the reservoir and the head end of the cylinder to accommodate rapid flow of fluid from the reservoir to the head end of the cylinder only when the spring is restoring the apparatus to normal position.

4. An impact absorbing apparatus for interposition between the draft gear and the lading in a railway car of the type having a center sill and a lading supporting frame mounted for movement relative to each other, the apparatus having a pair of heads normally abutted against stops carried on the center sill and force transmitting members carried on the lading supporting frame, a cylinder mounting one of the heads, a piston rod mounted on the other of the heads and projecting into the cylinder, a piston slidable in the cylinder and fixed to the rod, a fluid reservoir defining casing surrounding the cylinder, and a spring interposed between the other of the heads and the cylinder to urge the heads toward normal position, the improvement comprising a plurality of fluid flow restricting orifices in the side wall of the cylinder beyond the head end of the piston in its normal position, a large capacity passage communicating one end of the reservoir with the rod end of the cylinder, said cylinder orifices being spaced longitudinally and communicating with the reservoir so that when the heads are moved toward each other hydraulic fluid is expelled from the head end of the cylinder and taken in through said passage at the rod end of the cylinder and the piston progressively closes said orifices in the head end to diminish the fluid outflow rate from the head end, flow restricting baffles mounted interiorly of the casing, positioned between orifices, extending toward the cylinder, and dividing the reservoir into a plurality of compartments with restricted fluid flow between adjacent compartments, and a check valve controlled passage between the other end of the reservoir and the head end of the cylinder to accommodate rapid inflow of fluid when the spring is restoring the heads to normal position.

5. An impact absorbing apparatus for interposition between the draft gear and the lading in a railway car of the type having a center sill and a lading supporting frame mounted for movement relative to each other, the apparatus having a pair of heads normally abutted against stops carried on the center sill and force transmitting members carried on the lading supporting frame, a cylinder mounting one of the heads, a piston rod mounted on the other of the heads and projecting into the cylinder, a piston slidable in the cylinder and fixed to the rod, a fluid reservoir surrounding the cylinder, and a spring interposed between the other of the heads and the cylinder to urge the heads toward normal position, the improvement comprising a plurality of fluid flow restricting orifices in the side wall of the cylinder beyond the head end of the piston in its normal position, a large capacity unrestricted passage communicating one end of the reservoir with the rod end of the cylinder so that fluid may flow therethrough from the rod end of the cylinder to the reservoir at a rate sufficiently great as not to impede the restoration of the apparatus to normal position by the spring, the fluid load in the reservoir having an air space thereabove, said cylinder orifices being spaced longitudinally and communicating with the reservoir so that when the heads are moved toward each other hydraulic fluid is expelled from the head end of the cylinder and taken in through said passage at the rod end of the cylinder and the air in said air space is compressed and the piston progressively closes said orifices in the head end to diminish the fluid outflow rate from the head end, and a check valve controlled passage between the other end of the reservoir and the head end of the cylinder to accommodate rapid flow of fluid from the reservoir to the head end of the cylinder only when the spring is restoring the apparatus to normal position.

References Cited by the Examiner
UNITED STATES PATENTS

| 1,955,349 | 4/34 | Stevens | 213—43 |
| 2,973,174 | 2/61 | Stanwick et al. | 298—119 |
| 3,003,436 | 10/61 | Peterson | 105—454 |
| 3,047,162 | 7/62 | Blake | 213—8 |

MILTON BUCHLER, *Primary Examiner.*

ARTHUR L. LA POINT, LEO QUACKENBUSH,
*Examiners.*